INVENTORS.
DALE W. McKEE
KENNETH H. MINDRUM
BY
*J. P. Wiessler*
ATTORNEY.

Nov. 9, 1965 D. W. McKEE ETAL 3,216,598
INDUSTRIAL LIFT TRUCK WITH A MOVABLE LOAD SUPPORTING
ASSEMBLY THAT CONNECTS THE FRONT AND REAR
PORTIONS OF THE TRUCK
Filed Aug. 24, 1964 7 Sheets-Sheet 2

INVENTORS.
DALE W. McKEE
KENNETH H. MINDRUM
BY
*J. P. Wiessler*
ATTORNEY.

INVENTORS.
DALE W. MCKEE
KENNETH H. MINDRUM

ATTORNEY.

Nov. 9, 1965 D. W. McKEE ETAL 3,216,598
INDUSTRIAL LIFT TRUCK WITH A MOVABLE LOAD SUPPORTING
ASSEMBLY THAT CONNECTS THE FRONT AND REAR
PORTIONS OF THE TRUCK
Filed Aug. 24, 1964 7 Sheets-Sheet 4

INVENTORS.
DALE W. McKEE
KENNETH H. MINDRUM
BY
ATTORNEY.

INVENTORS
DALE W. McKEE
KENNETH H. MINDRUM
BY

ATTORNEY

United States Patent Office 3,216,598
Patented Nov. 9, 1965

3,216,598
INDUSTRIAL LIFT TRUCK WITH A MOVABLE LOAD SUPPORTING ASSEMBLY THAT CONNECTS THE FRONT AND REAR PORTIONS OF THE TRUCK
Dale W. McKee and Kenneth H. Mindrum, Battle Creek, Mich., assignors to Clark Equipment Company, a corporation of Michigan
Filed Aug. 24, 1964, Ser. No. 393,005
26 Claims. (Cl. 214—660)

This application comprises a continuation-in-part application of our application Serial No. 790,256, filed January 30, 1959, for Industrial Truck. As to additional subject matter disclosed in this application i.e. FIGS. 10–12 which is not disclosed in our application Serial No. 790,256, now abandoned, no claim is made herein except as such additional disclosure is embraced within the generic claims of our instant application, said additional disclosure being of a species of this invention, which species is disclosed and claimed in co-pending application Serial No. 391,655, filed August 24, 1964, the invention of Kenneth H. Mindrum, one of the joint inventors of the present invention.

The present invention relates generally to industrial trucks and is directed to a new principle of construction according to which such trucks may be successfully operated in relatively narrow aisles for loading and unloading operations at either side thereof while maintaining a high degree of stability.

Many previous attempts have been made to develop an industrial lift truck which could be manipulated successfully in confined areas, particularly in relatively narrow aisles between rows of stored material in warehouses and the like so as to maximize the space available for useful storage, while retaining a high degree of vehicle stability and capable of loading and unloading operations from either side of the aisle.

Prior lift trucks for the purpose contemplated have taken various forms. One such truck is capable of relatively narrow aisle operation in the provision of means for loading from one side only of the truck intermediate the ends thereof and within the pocket of a rigid U-shaped side opening frame. In this form the vehicle is capable of operating from one side only of an aisle. One vehicle design which embodies the side loading principle intermediate the ends of the truck is disclosed in U.S. Patent No. 2,621,812 to Lull.

Again, numerous front end side loader types have been conceived wherein, generally speaking, a loading fork is mounted at the front end of the truck in such a manner as to be actuatable to project from one or both sides of the truck for engaging and depositing loads without necessitating turning of the truck in an aisle in which it is operating. In one such prior construction the load engaging fork is adapted to pivot about a vertical axle toward either side of the truck so that a load could be picked up or deposited from either side of the vehicle. Front end side loader types of lift trucks tend to be unstable in operation in view of loading operations which occur forwardly and transversely of one corner of the vehicle. One design of truck of the type here generally referred to is disclosed in U.S. Patent No. 2,753,066 to Arnot. Such prior trucks have also provided wheels upon the load carrying fork to stabilize the truck in view of the relatively unstable length-to-width relationship of such trucks.

Still another type of lift truck has been developed especially for operation in narrow aisles. It may be generally characterized as a retractable mast and/or fork type wherein the lifting mast and/or fork is mounted to be projected longitudinally of forwardly extending legs of the trucks for picking up and depositing loads. The latter type of lift truck may be utilized in a relatively narrow aisle because the truck can be turned in an aisle only slightly larger than the wheel base of the truck when its lifting fork is retracted during normal truck travel within the pocket formed between the forwardly extending legs. Such construction is disclosed in U.S. Patent No. 2,667,985 to Woughter.

The present invention embodies many of the advantages of such prior constructions as above mentioned while being free of certain disadvantages inherent in such constructions and providing other advantages not heretofore possible in the implementation of the prior art. To accomplish this end we have conceived a new principle of truck construction in the provision of longitudinally spaced front and rear wheel borne and motorized truck frame assemblies connected together solely by means of a crank arm type coupling and load support means which include load elevating mechanism, at least a portion of which coupling and load support means is movable from one side of the truck to the other within the space provided between the frame assemblies along a curved path while another portion of the coupling and load support means is so movable from side to side along a mean path of less curvature, which includes a horizontal path, than the first-mentioned portion. The present invention also embodies means for rotating and load engaging means from one side of the truck to the other such that load engaging and handling operations can be carried out at either side of the truck, means for tilting load engaging apparatus in a vertical plane to facilitate the engagement and transporting of loads, and a novel steering system. Other advantages and novel aspects of the invention will be set forth in detail as the description of the invention proceeds.

It is therefore a primary object of the present invention to provide a new and improved side loading type industrial truck of a character which may be readily manipulated in confined areas.

A more specific object of the invention is to provide an improved vehicle construction which includes a pair of longitudinally spaced wheel supported assemblies coupled together by pivoted arm means and transversely movable load supporting means in such a manner as to provide a load receiving bay into which a load may be retracted from either side of the truck.

A further object of the invention is to provide an industrial truck of the type contemplated which embodies improved means for tilting load engaging means in a vertical plane relative to front and rear truck frame assemblies.

A further object of the invention is to provide an industrial truck having longitudinally spaced front and rear wheel borne assemblies wherein arcuately movable means is adapted to couple the wheel borne assemblies in combination with load support means which is movable transversely between the wheel borne assemblies with movement along a curved path of said arcuately movable means.

It is a still further object of the invention to provide side loader type vehicles having front and rear wheel borne units wherein a load handling and coupling mechanism is interposed in the space between said units and includes means pivotally mounted on opposite sides at fixed points to said units, a portion of which mechanism is actuatable in the space between said units and transversely thereof along a curved path about the fixed points.

It is a still further object of the invention to provide an industrial truck of the type contemplated wherein control means are provided to maintain load engaging means in a level position as the mast structure is moved from one side of the vehicle to the other side thereof.

It is another object of the invention to provide an industrial truck of the type contemplated which affords maximum stability under all conditions of operation.

It is another object of the present invention to provide an industrial truck of the above described type wherein one of the wheel supported assemblies is provided with means thereon connected to the wheels for driving the vehicle, while the other wheel supported assembly is provided with power means connected to the wheels for steering the vehicle; the control for such power steering means being effected by means located on said first wheel supported assembly.

It is still another object of the present invention to provide an industrial truck of the above described type which is economical to manufacture, is compact, has a minimum number of components, and is rugged and reliable in operation.

The above and other objects and advantages of the present invention will become more readily apparent to those skilled in the art from the following detailed description of illustrative embodiments thereof as shown in the accompanying drawings forming a part hereof and wherein.

Figure 1:
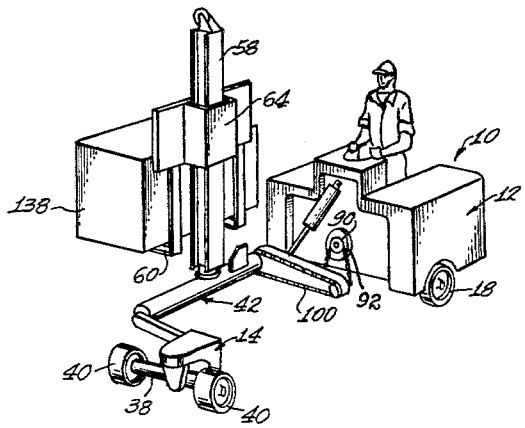
FIGURE 1 is a somewhat schematic view in perspective of one embodiment of a lift truck constructed in accordance with the present invention with the load engaging forks positioned at the right side thereof and showing a load thereon.

Referring to the drawings in detail, and first to FIGS. 1–6, there is shown an industrial fork lift truck generally designated by the reference numeral 10. The lift truck 10 generally comprises a main or rear wheel borne load support or truck frame assembly 12 and front wheel borne load support and steering frame 14. The rear load support 12 has mounted thereon an axle and differential housing 16 (FIG. 4) through which drive is effected to a pair of drive wheels 18 one of which is disposed adjacent each side of the truck. Support assembly 12 is provided with a pair of side compartments 20 and 22 and a central compartment 24. The side compartments 20 and 22 are constructed to form enclosures for the various operating elements of a lift truck such as the prime mover (which may be of any suitable type such as hydraulic drive, an internal combustion engine, or a battery operated electric motor), the hydraulic pump, and other components incidental to the operation of the lift truck 10. The central compartment 24 is shallower than the side compartments and projects upwardly therefrom as is evident from the drawings and thus provides a suitable recess wherein the operator of the truck may stand. For this purpose a suitable platform 26 is provided. Mounted upon the central compartment is a steering wheel 28 and various control handles 30 which are readily accessible to the operator for manipulating various elements of the truck in a manner to be described hereinafter.

The front wheel borne truck frame assembly 14 generally comprises an inverted L-shaped frame having a horizontally disposed top 32 and a depending vertically disposed leg 34. Secured to the top 32 is a depending support 36 for an axle 38 which carries a pair of wheels 40 which are operable to steer the truck 10 in a manner to be described presently.

The main support assembly 12 and the front assembly 14 are secured together in operative relationship by means of a generally U-shaped load support and actuating assembly which is generally designated by the reference numeral 42. The support means 42 comprises a pair of spaced operating arms 44 and 46 and a connecting cylindrical shaft or beam 54 upon which is journaled a cylindrical beam 48. One end of the operating arm 44 is journaled by means of a hollow shaft 50 in load support 12 for pivotal movement relative thereto. One end of the operating arm 46 is likewise journeled by means of a shaft 52 to the front support 14 for pivotal movement relative thereto.

The support means 42 is adapted and arranged to carry thereon a vertically extending mast 58 which preferably comprises a pair of opposed channel members. The mast 58 is suitably journaled upon the cylindrical beam 48 for pivotal movement about a vertical axis and carries thereon a pair of load engaging forks 60. The forks 60 are of conventional L-shaped arrangement and have the vertically extending legs thereof secured to a cross-plate 62. The cross-plate 62 has secured thereto a U-shaped bracket member 64 which is provided with opposed pairs of rollers 66 which are adapted and arranged to be disposed within the confines of channel members forming the mast 58 and thereby support the load engaging forks 60 for vertical reciprocation relative to the mast 58. In order to accomplish the vertical reciprocation of the load engaging forks 60, there is secured to the cross-plate 62 one end of each of a pair of chains 68 which extend upwardly and are trained over suitable sprocket means 70 which are rotatably journaled upon suitable brackets 72 secured to the top of the mast 58. The opposite ends of the chains 68 are suitably connected to a conventional hydraulic piston and cylinder assembly (not shown) disposed within the confines of the mast 58. Such cylinder means may be selectively actuated by manipulation of one of the control handles 30 to effect raising or lowering of the forks 60, as desired, in a manner well-known in the art.

In order to effect rotation of the mast 58 about a vertical axis, the mast is provided with a short cylindrical shaft 74 at the bottom thereof which is journaled for rotation upon the cylindrical beam 48 by means of an adaptor plate 76. Keyed to the cylindrical shaft 74 is a sprocket 78 which is adapted to be driven in rotation by means of an endless chain 80 which is trained over a second sprocket 82 connected to the output shaft of a conventional rotary hydraulic motor 84. The rotary hydraulic motor 84 may also be selectively operated by manipulation of suitable manually operated control means such as one of the control handles 30 located on the compartment 24.

The load engaging forks 60 are also adapted for movement transversely of the truck 10 by means now to be described. As previously mentioned, the operating arms 44 and 46 which are secured to the cylindrical shaft 54 are pivotally mounted relative to wheel borne assemblies 12 and 14. Pivotal movement of these arms will thus cause the cylindrical beam 48 to move in an arcuate path transversely of the truck 10. In order to accomplish this function, the journaled shaft 50 for operating arm 44 is provided with a sprocket 86 which is adapted for rotation by means of an endless chain 88 which is trained over a second sprocket 90 secured to the output shaft of a conventional rotary hydraulic motor 92. The rotary hydraulic motor 92 may be selectively actuated by manipulation of one of the control handles 30, as desired, to move the support means 42 together with the forks 60 transversely of the truck 10. For example, by reference to FIG. 5 it may be noted that the support element 42 can move transversely from the position thereof shown in solid lines to the position shown in dotted lines, such movement being in an arcuate path about the axis of shaft 50.

Figure 5:
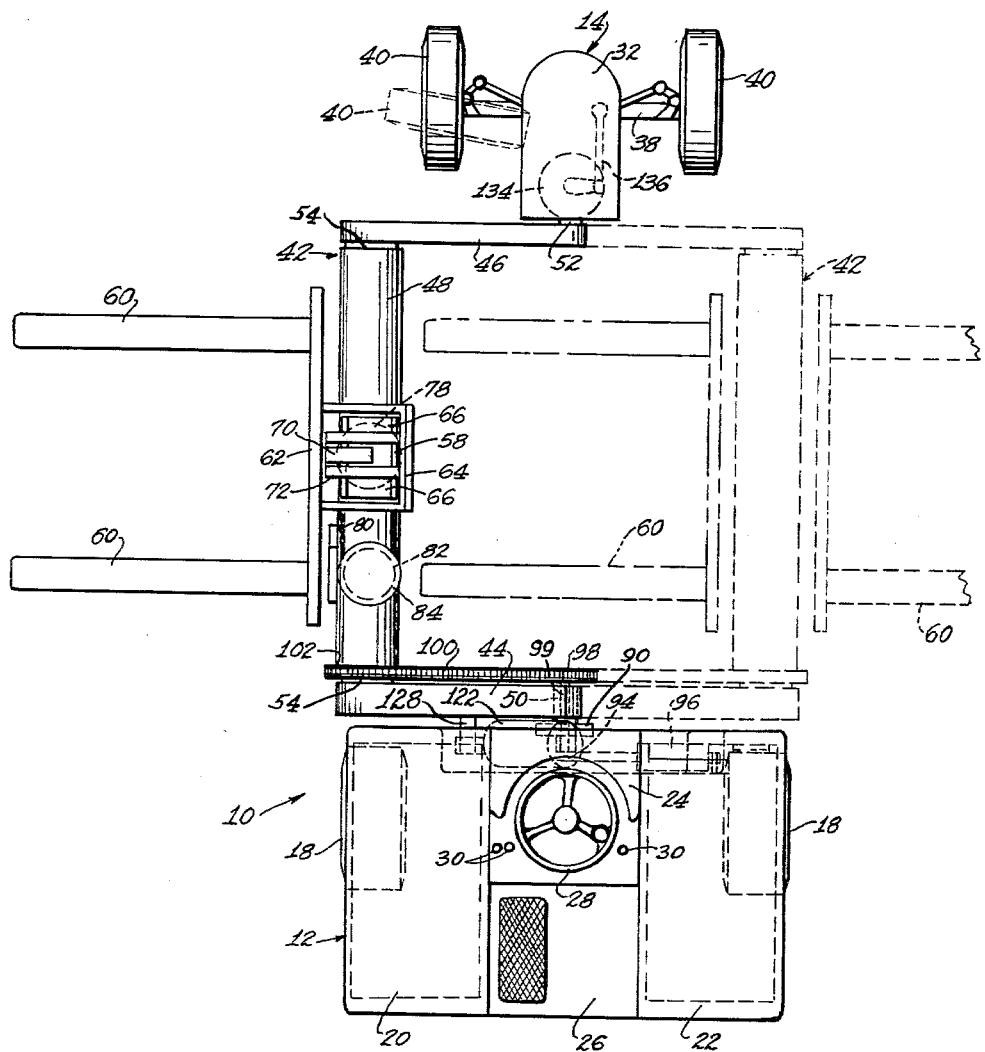
FIGURE 5 is a plan view of the lift truck shown in FIG. 4 and diagrammatically illustrates several positions of the load engaging forks corresponding to the positions shown in FIGS. 1–3.

Means are also provided in the present structure for tilting the mast 58 together with the load engaging forks 60 in order to prevent a load from slipping off of the forks once it has been picked up for transit or depositing in another location. To that end, sprocket 98 is adapted for pivotal movement, independently of shaft 50, by means of a lever arm 94 which is operated by a conventional hydraulic piston and cylinder assembly 96. Sprocket 98 and arm 94 are secured to opposite ends of a second shaft 99 which is telescoped within hollow shaft 50. The sprocket 98 is adapted to drive an endless chain 100 which is also reeved over a sprocket 102 secured to the cyindrical beam 48. Thus, the cylindrical beam 48 may be pivoted about its longitudinal axis to thereby impart a tilting movement to the mast, whenever desired, regardless of the position of the beam 48. When the supporting means 42 is being moved in an arcuate path transversely of the truck 10 by the aforementioned operation of the rotary hydraulic motor 92, and the hydraulic piston and cylinder assembly 96 is not in operation, the mast 58 is maintained in its vertical or near vertical position throughout the arc of lateral motion. That is, as supporting means 42 is cranked from one side of the vehicle to the other, such as is illustrated in FIG. 5, the weight of carriage 62, fork 60 and any load carried by the fork 60 rotates beam 48 on shaft 54 with sprocket 102 so that the mast remains at all times in a vertical position as chain 100 wraps about the opposite sides of fixed sprocket 98, assuming that cylinder-piston assembly 96 is not actuated to tilt the mast by rotating sprocket 98. The mast 58 thus maintains itself in a normally vertical position regardless of the angular position of supporting means 42 and regardless of the rotated position of the mast and fork about the axis of shaft 74.

Figure 7:
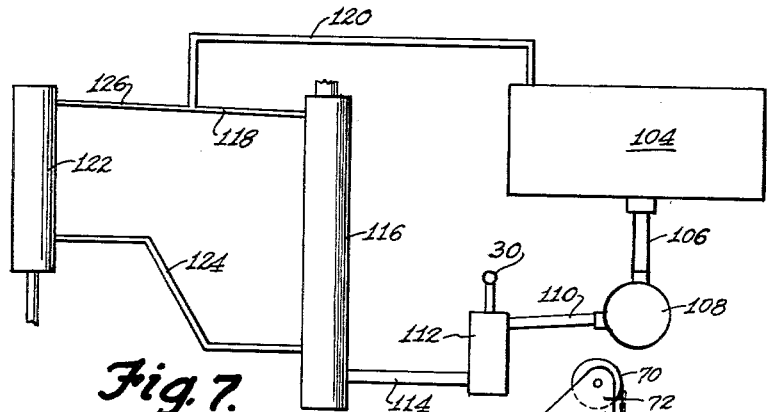
FIGURE 7 is a schematic showing of a portion of the hydraulic circuit for a lift truck made in accordance with the present invention.

In the truck 10 of the present invention, means are also provided to eliminate rise and fall of the load engaging forks 60 while the supporting element 42 is undergoing its lateral movement in an arcuate path to thereby keep the forks 60 in the same plane throughout such lateral motion. Referring to FIG. 7, which schematically shows a portion of the hydraulic circuit for the truck of the present invention, such means will now be described.

The truck 10 is provided with a hydraulic fluid containing reservoir or sump 104 which contains a suitable quantity of fluid to supply the various hydraulic components above described as well as others to be described hereinafter. Communicating with the sump 104 is a conduit 106 which supplies fluid to a conventional high pressure pump 108 of the positive displacement type such as a gear pump or the like. The pump 108 delivers fluid under pressure through a delivery conduit 110 and into a control valve 112 which may be manually operated by means such as one of the control handles 30. In the portion of the hydraulic circuit herein shown, the valve 112 is adapted and arranged to control the supply of fluid through a conduit 114 to one end of a hydraulic piston and cylinder assembly 116 which represents the means confined to the mast 58 for raising and lowering the load engaging forks 60 as aforementioned. When fluid is admitted to the one end of cylinder 116 through conduit 114, the piston therein is displaced and fluid is simultaneously discharged into a conduit 118 and thence into a branch or overflow conduit 120 for return to the sump 104.

Figure 4:
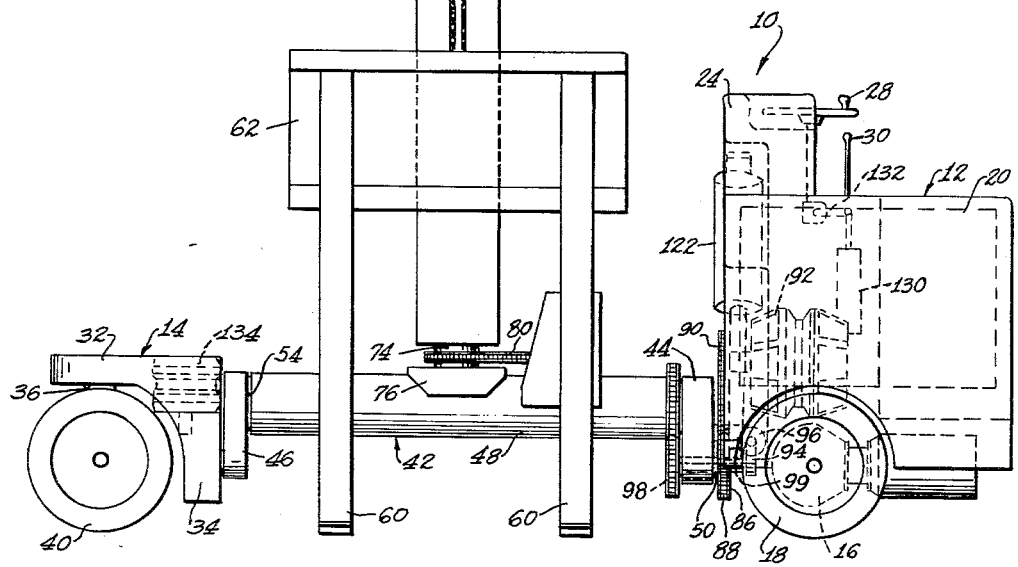
FIGURE 4 is a side elevational view of a lift truck embodying the principles of the present invention.
Figure 6:
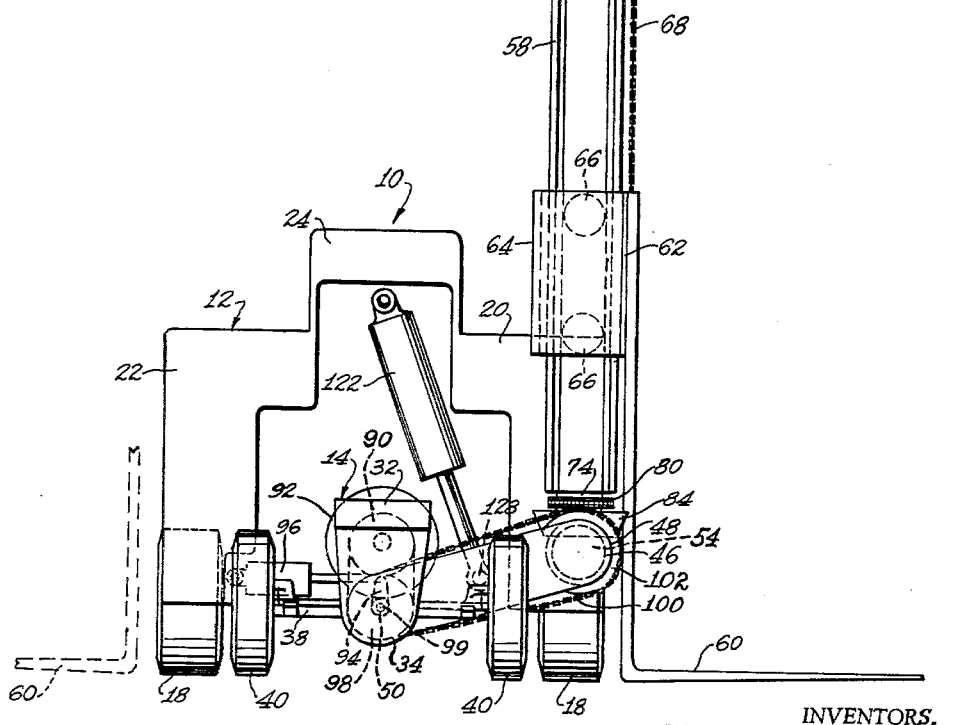
FIGURE 6 is a front elevational view of the lift truck shown in FIGS. 4 and 5.

In the system of the present invention an additional hydraulic piston and cylinder assembly 122 is provided, the cylinder of which is connected at its lower end by means of a conduit 124 to the lower end of cylinder 116, and at its upper end by means of a conduit 126 to the branch conduit 120. Referring to FIGS. 4 and 6, it may be seen that the cylinder 122 is pivotally mounted to the central compartment 24 of the support assembly 12 and the piston rod thereof is pivotally connected at 128 to the operating arm 46 of the supporting means 42. When the load engaging forks 60 have been elevated to the desired position, the control valve 112 is set in a locked position to thus retain the fluid admitted to the cylinder 116. When the operating arm 44 is subsequently pivoted in the first half of its arcuate path of travel by operation of the rotary hydraulic motor 92 as aforementioned, the piston rod of the cylinder assembly 122 will be displaced upwardly thus creating a reduced pressure area within the cylinder which will cause fluid to be withdrawn from the cylinder 116 through the conduit 124 and into the cylinder 122. The load engaging forks 60 will thus be lowered relative to the mast, but, will remain in their original plane since the mast is being elevated slightly by the arcuate path of travel of the operating arm 46. When the operating arm 46 is moving in the last half of its arcuate path, the above-described operation will be reversed and fluid will be displaced from the lower part of cylinder 122 into the lower part of cylinder 116 to raise the forks 60 relative to the mast 58 as the mast is lowered by its arcuate travel. Thus, the cylinder 122 operates as a slave element which is responsive to the movement of the operating arms 44, 46 to withdraw fluid from the cylinder 116 during the upward movement of the operating arms and to force such withdrawn fluid back into the cylinder 116 during the downward movement of the operating arms. The load engaging forks 60 are thereby maintained in a substantially constant horizontal plane throughout the movement of the operating arms 44, 46 once the control valve 112 has been set in locked position to retain the fluid which has been admitted to the lift cylinder 116.

Figure 8:
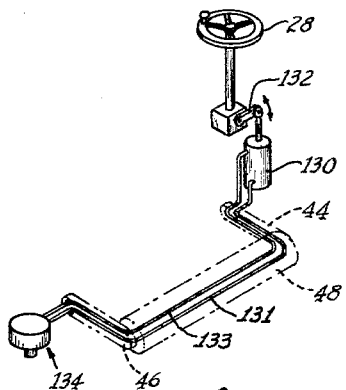
FIGURE 8 is a schematic view in perspective showing the elements of the improved steering system of the present invention.

The steering of the truck 10 may be accomplished by means of a hydraulic piston and cylinder assembly 130 which is connected by a suitable linkage 132 for operation upon manipulation of the steering wheel 28. The steering system is shown schematically in FIG. 8. The hydraulic piston and cylinder assembly 130 is adapted and arranged to supply fluid through suitable hydraulic lines 131 and 133 to a conventional rotary hydraulic motor 134 mounted upon the auxiliary steering frame member 14. The motor 134 is of the reversible type and has the output shaft thereof connected directly to a steering linkage 136 associated with a steering spider on the axle 38 and operable to pivot the wheels 40 in a manner well-known in the art for steering the truck 10.

Figure 9:
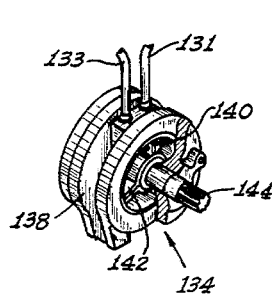
FIGURE 9 is a perspective view on an enlarged scale illustrating a rotary hydraulic motor of a type suitable for use in the steering system of FIG. 8.

A motor of the above-mentioned type is generally shown in perspective in FIG. 9 and comprises a cylindrical casing 138, closed at its ends, having an annular cavity 140 therein. Within the annular cavity 140 is disposed a vane member 142 which is rigidly secured to an output shaft 144.

With the above described structure and arrangement, when the steering wheel 28 is turned in one direction the linkage 132 will be actuated to cause the hydraulic cylinder and piston assembly 130 to displace fluid under pressure through the hydraulic line 131 and into the annular cavity 140 of the motor 134 at one side of the vane member 142. A reduced pressure area will thus be created in the opposite end of the cylinder 130 and fluid will be drawn from the cavity 140 through the hydraulic line 133 at the opposite side of the vane member 142. The vane member 142 will thus be rotated through a predetermined arc within the cavity 140, dependent upon the amount of movement of the steering wheel 28, and will impart a predetermined movement to the output shaft 144. The connection of the output shaft 144 to the steering linkage 136 will impart a predetermined angular movement to the wheels 40 to thereby steer the vehicle. By rotating the steering wheel 28 in the opposite direction, the hydraulic line 133 will become a high pressure line and the hydraulic line 131 will become a low pressure line with the result that the vane member 142 will be rotated in the opposite direction and thus the wheels 40 will be turned in an opposite direction to that described above.

It is obvious that, while not described in detail herein, the various hydraulically operated components may be supplied with fluid through any well-known type of flexible hydraulic conduits. The supply conduits for the rotary hydraulic motors 78 and 134 as well as the hydraulic piston and cylinder assembly secured to the mast 58 may, if desired, be enclosed within the operating arms 44 and 46 and the cylindrical beam 48 by making the various pivotal connections hollow and passing the flexible conduits through such connections.

By passing the hydraulic lines 131 and 133 through the operating arms 44 and 46 and the cylindrical beam 48 there is provided a novel hydraulic steering linkage which is particularly adaptable for use in the truck 10 of the present invention which allows for the pivotal movement of the mast 58 throughout an unobstructed path. It is obvious that if a conventional mechanical steering linkage were provided between the rear wheel supported element 12 and the front steering wheel frame member 14 the flexibility of operation of the truck 10 of the present invention would be seriously impaired due to obstruction by such linkage.

Figure 2:
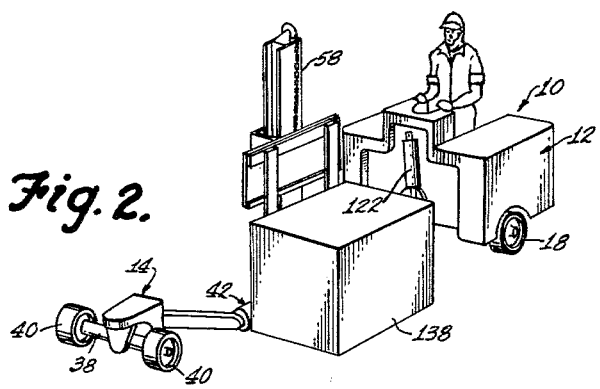
FIGURE 2 is a view similar to FIG. 1, but the load engaging forks are shown at the left side of the vehicle for picking up or depositing a load.

Having now described in detail the structure and operation of the essential elements of the above described embodiment of the present invention it is believed that a more lucid understanding of the advantages thereof will be attained from the following description of a typical sequence of operations of the truck in picking up, transporting, and depositing a load. For the purposes of such description, let it be assumed that the various operating components are positioned as shown in FIGS. 4, 5 and 6; that is, the cylindrical beam 48 is in its furthermost position toward the left side of the truck 10 and the load engaging forks 60 are projecting outwardly to engage a palletized load. FIG. 2 of the drawing shows the truck 10 with a load 138 in position on the forks 60 when the elements are in the above described positions.

Figure 3:
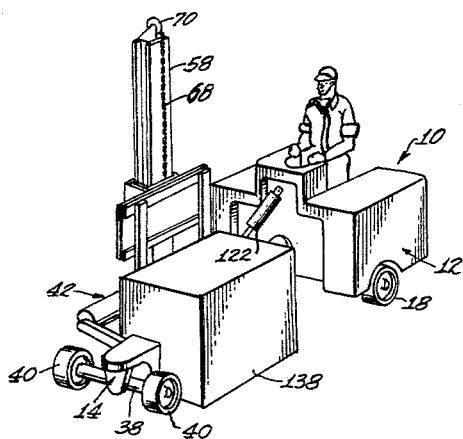
FIGURE 3 is a view similar to FIGS. 1 and 2 and shows the load engaging forks retracted into the bay formed between the front and rear wheel supported elements.

In order to move the load 138 transversely inwardly of the truck 10 for movement to another location, the operator will preferably first manipulate the appropriate one of the control handles 30 to cause fluid under pressure to be admitted into the hydraulic piston and cylinder assembly 96 to thereby cause the cylindrical beam 48 to be pivoted slightly about its longitudinal axis. Such will effect a tilting of the mast 58 together with the load engaging forks 60 in order to prevent the load 138 from slipping off of the forks. The hydraulic piston and cylinder assembly 116 may then be actuated to effect a slight elevation of the load engaging forks 60 to provide ground clearance for the load 138. The rotary hydraulic motor 92 will then be energized to effect a pivoting of the operating arms 44 and 46 whereupon the cylindrical beam 48 will move more transversely of the truck 10 in an arcuate path of travel, as above described. The various components as well as the load 138 will then be substantially in the position as shown in FIG. 3 or the drawing. The truck 10 may then be driven to any desired location with the wheels 18 being driven by the prime mover and the wheels 40 supplying the steering effort under the control of the steering wheel 28 in the manner above described.

Let it now be assumed that it is desired to deposit the load 138 in a position transversely to the right of the truck 10. In order to accomplish this, the operator will first manipulate the appropriate one of the control handles 30 to effect an energization of the hydraulic piston and cylinder assembly 116 to thereby effect an elevation of the load engaging forks 60 relative to the mast 58 to a height such that the lowermost portion of the forks will be above the top of the steering and load support assembly 14. Such elevation will provide the necessary clearance for rotating the mast 58 together with the load engaging forks 60 about a vertical axis. The operator will then manipulate the appropriate control handle 30 to effect an energization of the rotary hydraulic motor 84 to thereby cause the mast 58 to be revolved about a vertical axis, as previously described, whereupon the load engaging forks 60 together with the load 138 will be positioned substantially as shown in FIG. 1 of the drawings. The hydraulic piston and cylinder assembly 116 will then be energized to effect a lowering of the load engaging forks 60 relative to the mast 58 to thereby deposit the load 138 upon the ground or other supporting surface. In order to retract the load engaging forks 60 from the projected position, the rotary hydraulic motor 92 will again be energized in a reverse direction to cause the operating arms 44 and 46 together with the cylindrical beam 48 to be moved transversely of the truck 10 in an arcuate path of travel (with the forks 60 maintaining their horizontal plane) until beam 48 is again in the positon shown in FIG. 2. The forks 60 will, however, be located within the confines of the truck 10 and the truck may then be driven to any desired location to pick up another load.

It should be pointed out that the above-described sequence of operations is exemplary only and that the various elements may be operated in any desired sequence to meet the various operating conditions which may be encountered. The only limitation on the sequence of operations of the various components is that prior to energization of the rotary hydraulic motor 84, the load engaging forks must be elevated to a height to provide a clearance between the forks 60 and the support assembly 14. If desired, it is contemplated that suitable interlocking control means may be provided to prevent operation of the rotary hydraulic motor 84 if the load engaging forks 60 are below a predetermined elevation.

Figure 10:
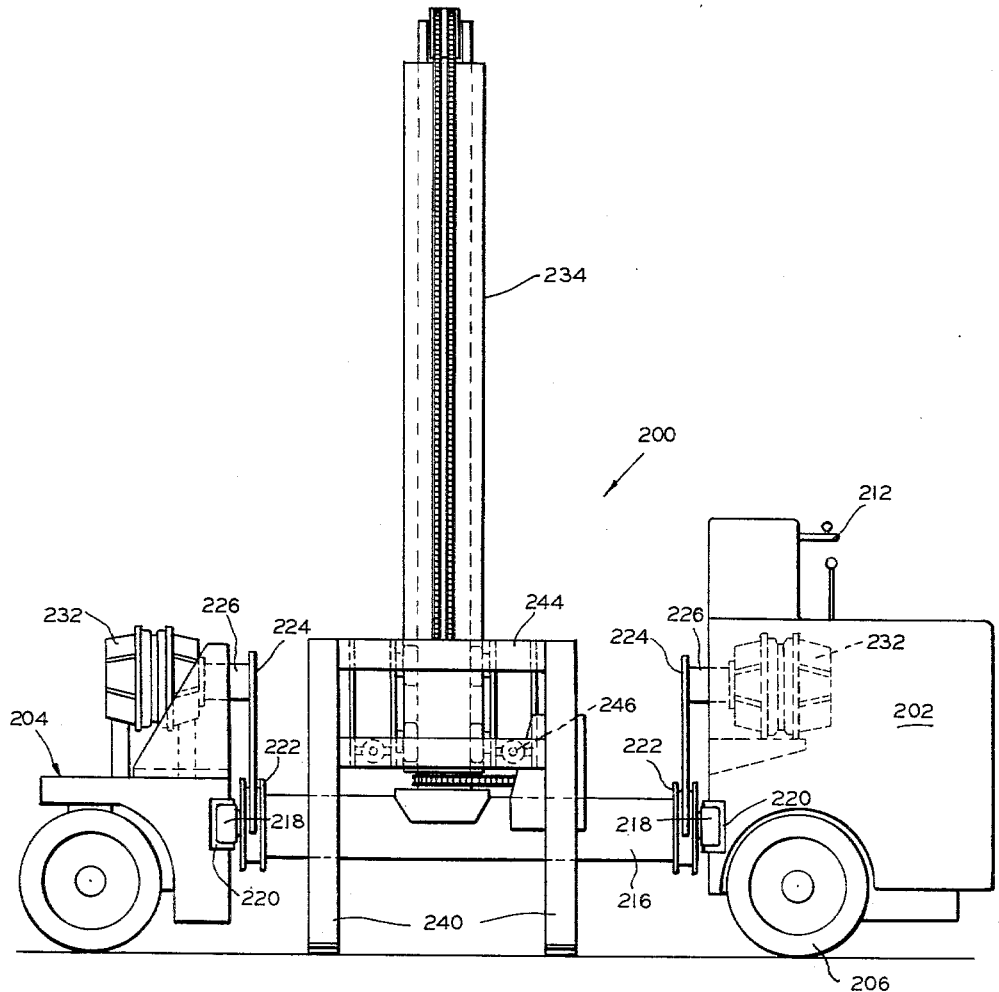
FIGURE 10 is a side elevational view of a lift truck illustrating another embodiment of the present invention.
Figure 11:
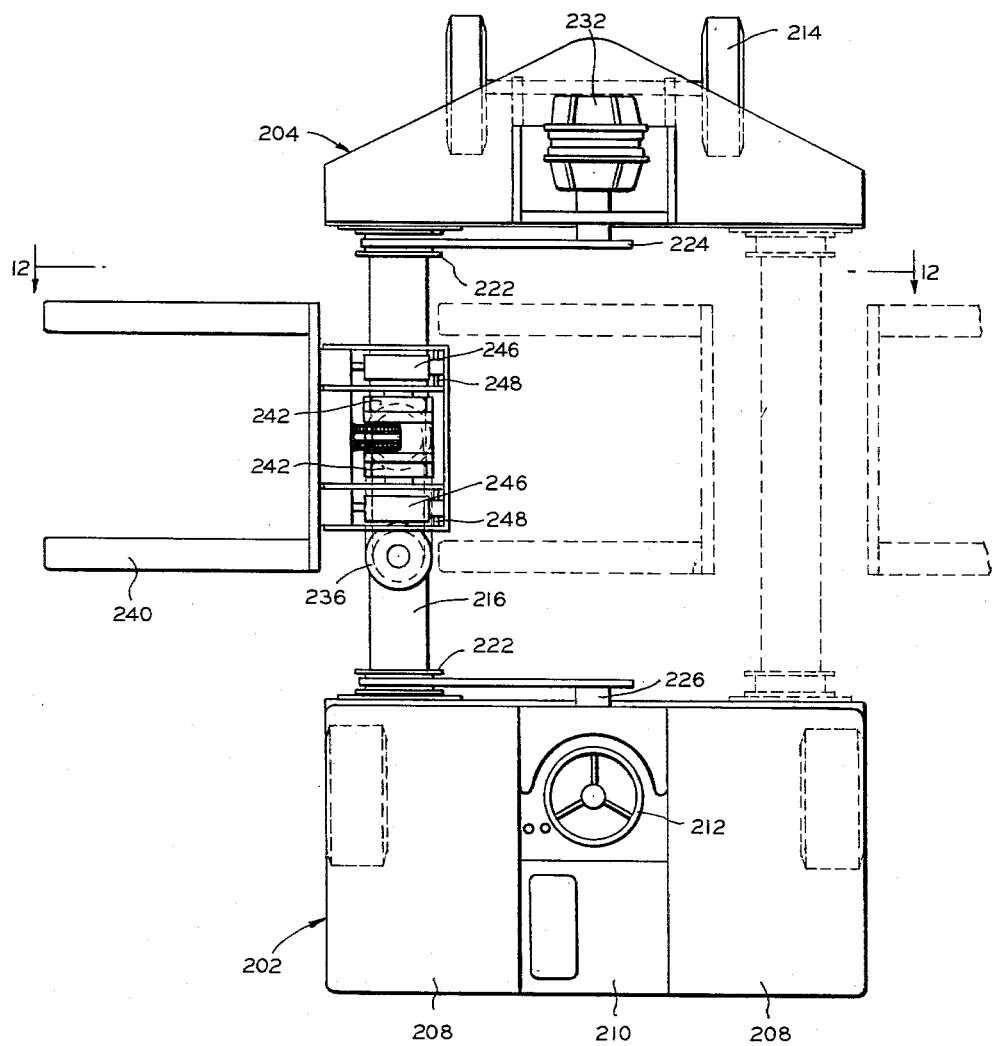
FIGURE 11 is a plan view of the modified form of the invention shown in FIG. 10 and illustrates diagrammatically several positions of the load engaging forks.
Figure 12:
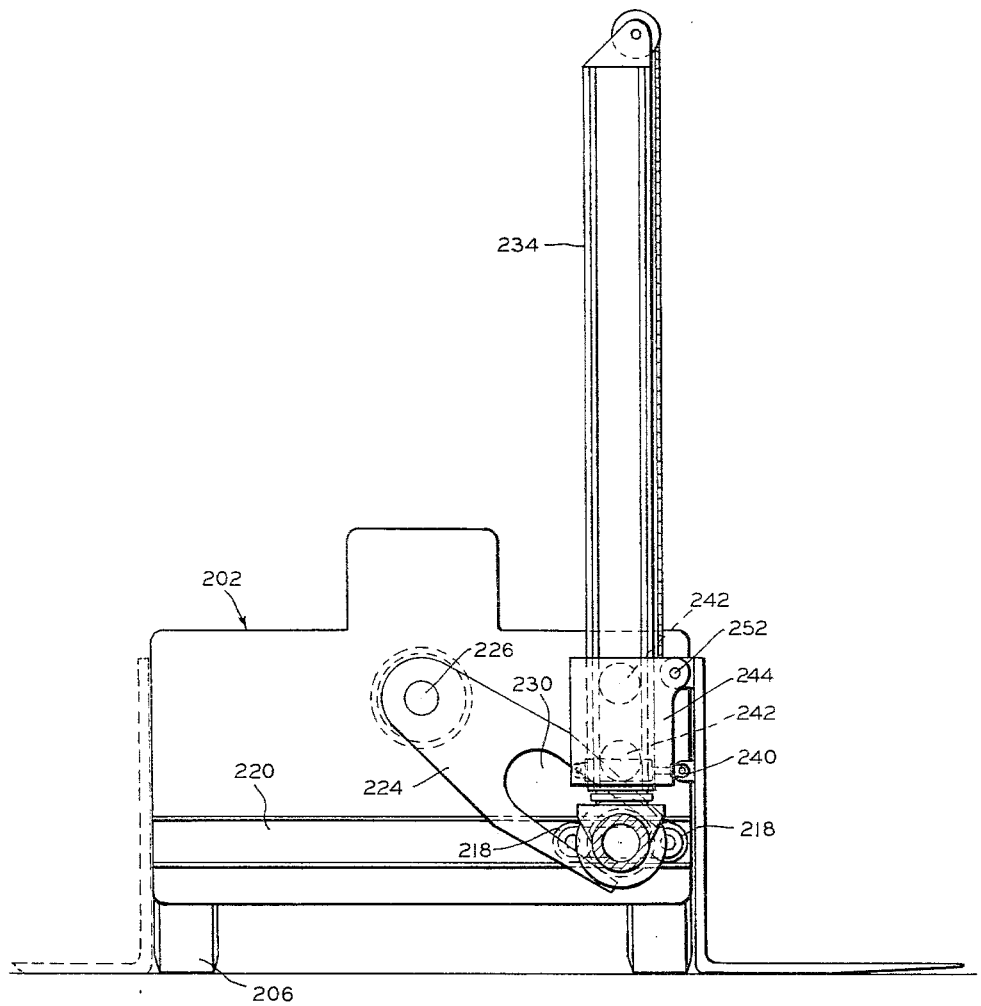
FIGURE 12 is a partial sectional view of the lift truck taken along line 11—11 of FIG. 11.

Referring now to FIGS. 10, 11 and 12, a second illustrative embodiment of our invention is disclosed somewhat schematically in the truck shown at numeral 200 which comprises generally a main or rear wheel borne load support or truck frame assembly 202 and a front wheel borne load support 204. The rear load support 202 has mounted thereon an axle and differential housing, not shown, through which drive is effected to a pair of drive-steer wheels 206, such as is generally shown at numeral 16 in FIG. 4. The support assembly 202 is provided with a pair of side compartments 208 and a central compartment 210 constructed to form an enclosure for the various operating elements of the lift truck, such as the prime mover, hydraulic mechanism, and other components incidental to the operation of the lift truck and similar to the arrangement shown in FIGS. 1 through 6, and so not separately described again in respect of this embodiment. The central compartment 210 provides an operator's stand-up compartment in which is located a steering wheel 212 and various other operator controls for manipulating the truck and operating the load lifting mechanism to be described.

The front wheel borne truck frame assembly 204 comprises generally an inverted L-shaped frame, in cross-section, supported by a pair of transversely spaced wheels 214 and having a width at the side thereof which faces the support assembly 202 substantially equal to the width of the latter assembly.

The wheel borne assemblies 202 and 204 are secured together in operative relationship by means of a longitudinally extending cylindrical support beam 216 having mounted on axles at its opposite ends pairs of rollers 218 for guided movement in a pair of opposed channel-shaped guideways 220 secured to the front and rear wheel borne assemblies, respectively, in facing relation and extending transversely across the full width of each of said wheel borne assemblies. Secured, as by welding, adjacent each opposite end of beam 216 is a cylindrical flanged member 222 which provides a bearing surface between the flanges of each member 222 for operative connection to a bifurcated crank arm or yoke 224 mounted securely from a pivot shaft 226, a pair of centrally located, coaxial, longitudinally spaced shafts 226 being mounted for pivotal movement in the front and rear wheel borne assemblies, respectively. Each crank arm 224 is formed to provide a continuous operative connection with respective ones of flanged members 222 on beam 216 by means of an elongated slotted end 230 formed between the side arms of each bifurcated crank arm. Each shaft 226 is adapted to be rotated by a hydraulic motor 232. A pair of such hydraulic motors is provided, one suitably mounted in each wheel borne assembly 202 and 204 so that the pair of shafts 226 are coaxial, the pair of crank arms 224 being of equal length, whereby to provide a drive mechanism for actuating beam 216 transversely of the truck along guideways 220 from a position adjacent one side of the truck, as shown in FIG. 12, to a position adjacent the opposite side thereof, as shown in dotted line in FIG. 11. As is apparent, the crank arms 224 engage respective ones of flanged members 222 between the flanges of each thereof so that the longitudinal structural support between the wheel borne assemblies is provided by the crank arms fixed, except for rotation, on central shaft members 226, and the holding engagement thereof with rigid beam 216 at the flanged members 222 thereof. The hydraulic motors 232 are mounted rigidly in the respective wheel borne assemblies, and they are adapted to be operated by means of hydraulic pump mechanism, not shown, by dividing equally, in known manner, a flow of hydraulic oil to the motors.

Mounted upon beam 216 is a vertically extending mast assembly 234 which may be constructed the same as the mast assembly 58 described in the previous embodiment. Chain and sprocket mechanism generally shown at numeral 236, FIG. 11, may be constructed the same as the mechanism described at numerals 74, 78, 80, 82 and 84 in connection with the previous embodiment, and so neither the mast structure 234 nor means 236 for rotating the same about the vertical axis thereof on beam 216 need be described in detail again.

Load engaging forks 240 are mounted by means of pairs of rollers 242 and a fork carriage 244 upon mast 234, also similarly as in the previous embodiment, except that the fork carriage 244 extends further transversely outwardly of the mast to provide for the mounting of a pair of longitudinally spaced and transversely extending hydraulic cylinder actuators 246 which are connected at the cylinder base end to the carriage by means of pivot pins 248 and at the rod ends to fork brackets 250 mounted on the rear sides of fork tines 240 for pivoting the fork upwardly or downwardly, as desired, about an upper longitudinally extending pivot shaft 252 which connects the fork 240 to the carriage 244.

The operation of this second embodiment of the invention is broadly similar to the operation of the first described embodiment in that the sole structural connection between the front and rear borne assemblies comprises the crank arms 224 and beam 216 having mounted thereon a vertical mast and fork carriage assembly capable of elevating the forks to a desired height, and also rotating the entire mast assembly by means of mechanism 236 from one side of the truck to the other, while at the same time providing for transferal of the load engaging mechanism from a position adjacent one extreme side of the truck to a position adjacent the opposite extreme side thereof. Thus, the description of operation in terms of engaging, manipulating and depositing loads in relatively narrow-aisle operations is similar in respect of both embodiments of the present invention, except that the mechanism for effecting such operations in the latter described embodiment is simpler in many respects than that described with respect to the first embodiment. In the latter described embodiment there is, for example, no requirement for providing hydraulic control mechanism in respect of maintenance of a given height of the fork, such as described with respect to FIG. 7, inasmuch as the support beam 216 operates inherently always in a flat plane, not along an arcuate path as in the first described embodiment. Also, the fork tilt mechanism is simpler in the last-described embodiment, and the mast assembly 234 remains automatically in a vertical position during transverse movement of beam 216 without the necessity of providing separate mechanism as is the case in the first-described embodiment.

When equal flows of tydraulic fluid under pressure are provided to the pair of hydraulic motors 232, rotation of shafts 226 is effected causing crank arms 224 to be rotated in a selected direction whereby to actuate beam 216 transversely of the truck on rollers 218 in guideways 220, slot 230 in each crank arm being elongated to accommodate the arcuate movement of each crank arm relative to the horizontal movement of the beam 216.

It should now be apparent that the industrial lift truck embodiments of the present invention provide a somewhat revolutionary arrangement which is superior to prior art structures. The truck is capable of being readily maneuvered in confined areas, may readily pick up or deposit a load transversely at either side thereof, is extremely flexible in its operation, and may transport most loads without such loads projecting outwardly from the boundaries defined by the frame of the truck. In the accomplishment of these exemplary results, we have provided an extremely novel vehicular structure utilizing front and rear wheel borne units, a load lifting mechanism comprising a pair of rotatable crank arms interposed in the space between said units and pivotally mounted to each of said units so that the crank arms move during pivoting thereof transversely of the machine along a curved path, and an upright load-supporting structure operatively connected to the crank arms and pivotable relative thereto, the latter structure remaining in a vertical or substantially vertical position during movement of the crank arms about the pivoted connections thereof to the wheel borne units. In addition, we have provided in such load handling vehicular structure a unique steering system, novel means for maintaining substantially horizontal planar movement of load engaging means during arcuate movement of the crank arms of the first described embodiment from one side of the vehicle to the other, means to rotate such load engaging means for engaging and depositing loads at either side of the vehicle, and various other novel structural relationships in such vehicles, all as described in detail above. Inherent in such vehicular structure for the purposes contemplated is one of paramount advantage over prior art side loader vehicles in the provision of such centrally mounted crank mechanism relative to the front and rear wheel borne units of the vehicle whereby a rigid connection is provided in combination with load supporting mechanism between the wheel borne units and irrespective of the relative transverse position of the load supporting means to the wheel borne units. The truck of both embodiments are, of course, by virtue of the described arrangement of elements, highly stable under all conditions of operation. It should also be herein pointed out that the hydraulic steering linkage above described provides a high degree of flexibility of design for the truck 10 which would not be possible with the conventional forms of mechanical steering linkages.

While the present invention has been herein described by way of reference to only two illustrative embodiments, as shown in the drawings, it will be obvious to those familiar with the art that the invention is capable of many alterations in the construction and arrangement of parts, substitutions of various equivalent components and assemblies, and alternative embodiments without departing from the true spirit thereof. It is, therefore, not intended that the invention should be restricted or limited to either particular embodiment shown and described; nor otherwise than by the terms of the appended claims.

We claim:

1. An industrial truck comprising spaced apart front and rear wheel borne load supports, a support means interconnecting said load supports including a front transversely extending operating arm having one end thereof pivotally mounted upon said front support, a rear transversely extending operating arm having one end thereof pivotally mounted upon said rear support and a longitudinally extending beam connected to opposite ends of said front and rear operating arms, vertically extending load handling means secured to said beam, and means for pivoting said interconnecting support means about the pivotal mountings of said arms.

2. A truck as claimed in claim 1, including means operatively connected between one of said supports and said beam for rotating said beam and the load handling means about a longitudinal axis thereby to incline said load handling means relative to the vertical.

3. The combination as specified in claim 1, including means operatively connected between said beam and load handling means for pivoting the latter about a vertical axis.

4. An industrial truck comprising spaced apart front and rear wheel borne load supports, a first radially extending operating arm having one end thereof pivotally connected to said front support, a second radially extending operating arm having one end thereof pivotally connected to said rear support, a beam pivotally connected to the opposite ends of said first and second operating arms to thereby interconnect said load supports, a mast mounted upon said beam and extending generally vertically upwardly therefrom, load engaging means mounted upon said mast for vertical reciprocation relative thereto, means operatively connected to said operating arms for pivoting said arms thereby to move said beam transversely relative to said load supports in an arcuate path, elevating means comprising a first fluid motor means operatively connected between said mast and said load engaging means for raising and lowering the latter, and second fluid motor operatively connected to one of said operating arms and to said first fluid motor means, said second fluid motor means being operable during the arcuate travel of said operating arms to control said elevating means by withdrawing fluid from said first fluid motor during the upward travel of said operating arm and forcing such withdrawn fluid back into said first fluid motor means during downward travel of said operating arms whereby said load engaging means is maintained at a substantially constant elevation.

5. The combination as specified in claim 4, including selectively operable means operatively connected between said beam and said mast for pivoting said mast about a vertical axis to position said load engaging means for outward projection at either side of said beam.

6. The combination as specified in claim 4, including selectively operable means connected between one of said wheel borne load supports and said beam and operable to pivot said beam about a horizontal axis to thereby tilt said mast and said load engaging fork means.

7. An industrial truck of the character described, comprising front and rear wheel borne load supports spaced apart to accommodate an elevating mechanism therebetween, a support means for said elevating mechanism forming the sole structural means for joining said load supports, said support means being adapted and arranged for pivotal movement transversely relative to said load supports in an arcuate path, steerable wheel means located on one of said wheel borne load supports, a steering control element located on the other of said wheel borne load supports, first reversible hydraulic motor means located on said one wheel borne load support and operably connected to said steerable wheel means, second reversible hydraulic motor means located on said other wheel borne load support and operably connected to said steering control element, and conduit means interconnecting said first and second hydraulic motor means, said conduit means being carried by said support means and movable therewith to provide a flexible steering linkage between said front and rear wheel borne load supports.

8. An industrial truck comprising spaced apart front and rear wheel borne truck frame assemblies, a longitudinally extending offset support element joining said frame assemblies by means of a pair of radially extending operating arms pivotally connected about fixed axes to respective ones of said frame assemblies, vertically extending load support means supported on said offset support element, means for pivoting said operating arms about the fixed pivotal connections thereof to actuate said support element in an arcuate path intermediate the frame assemblies, and means operatively connected to said load support means for maintaining the latter means substantially vertical during arcuate movement of said support element.

9. A vehicle comprising spaced apart front and rear wheel borne frame assemblies, a longitudinally extending offset support means joining said frame assemblies having a pair of transversely extending arms pivotally connected to respective ones of said frame assemblies and a longitudinally extending beam interconnecting said arms at points remote from the pivotal mounting, load engaging means mounted upon said support means and extending substantially horizontally outwardly thereof, means for moving said support means transversely of the frame assemblies in a curved path and longitudinally intermediate the frame assemblies, and means for maintaining said load engaging means in said substantially horizontal relation during such transverse movement of said support means.

10. A truck as claimed in claim 9 wherein other means are provided for actuating the load engaging means to a transversely extending position relative to either side of the offset support means.

11. An industrial truck comprising spaced apart front and rear wheel borne truck frame assemblies, a longitudinally extending load carrying and support means forming the sole structural connection between said load supports, said carrying and support means including a pair of radially extending crank arms pivotally connected at their respective one ends to respective ones of said truck frame assemblies and a longitudinally and vertically extending load carrying means interconnecting said arms adjacent the opposite ends thereof, and means operatively connected to the radial crank arms for actuating said arms in a curved path transversely of the truck intermediate said truck frame assemblies for actuating said load carrying means transversely of the truck from a position adjacent one side thereof to a position adjacent the opposite side thereof.

12. A truck as claimed in claim 11 wherein load engaging means form a portion of said load carrying means, and means are provided for maintaining said load engaging means at a substantially contsant elevation during curving movement of said radial crank arms.

13. A truck as claimed in claim 11 wherein load engaging means form a portion of said load carrying means, and selectively operable control means is operatively connected to the load engaging means for actuating the latter in rotation about a vertical axis whereby to project said load engaging means alternately transversely outwardly of either side of the truck.

14. An industrial truck comprising front and rear wheel borne truck frame assemblies, radially, longitudinally and vertically extending support means comprising the sole structural means for interconnecting said frame assemblies and for elevating loads relative thereto, said support means including fixed pivot means mounted in facing relation on said front and rear frame assemblies, a pair of radially extending arms pivotally mounted at the one ends thereof to opposite ones of said fixed pivot means for movement in an arcuate path transversely of the truck and load elevating means connected to said arms at points remote from the pivotal mountings thereof, and means for maintaining said load elevating means in a substantially vertical position during transverse movement thereof with said arcuately movable arms.

15. An industrial truck comprising spaced apart front and rear wheel borne truck frame assemblies, a longitudinally extending load support means interconnecting said truck frame assemblies to provide a load receiving bay intermediate the ends of the truck, load handling means including a vertically extending mast mounted upon said load support means and load engaging means movable vertically along said mast, means for moving said support means from a position adjacent one side the truck to a position adjacent the opposite side thereof, means for actuating said load engaging means from a load engaging position adjacent said one side of the truck to an opposite load engaging position adjacent said opposite side thereof, and means for tilting in a vertical plane said load handling means about a horizontal axis to facilitate the engagement of loads by said load engaging means.

16. A self-propelled industrial truck comprising longitudinally spaced apart front and rear wheel borne truck frame assemblies, prime mover means associated with one of said frame assemblies and connected to drive the wheels thereof, an operator's station located at one of the truck frame assemblies, a load support and actuating means interconnecting the frame assemblies, a load engaging mechanism connected to said support and actuating means, said latter means and load engaging mechanism being actuatable together without interference from a location adjacent one side of the frame assemblies to a location adjacent the opposite side thereof, said load engaging mechanism being operable at either side of the truck to engage material intermediate and transversely outwardly of said frame assemblies including means operably connected to the load engaging mechanism for actuating same from a position transverse of one side of the load support means to a position transverse of the opposite side thereof, said load support and actuating means including rotatable crank arm mechanism connected to the front and rear truck frame assemblies for actuating said load engaging mechanism from side to side of the frame assemblies.

17. An industrial truck comprising longitudinally spaced front and rear wheel borne truck frame assemblies, longitudinally extending support means forming the sole means connecting said frame assemblies for maintaining a fixed spaced relationship therebetween, prime mover means associated with one of the frame assemblies for transmitting tractive effort to the wheels thereof, an operator's station located at one of said frame assemblies, operator controlled power means for actuating the support means from a position adjacent one side of the truck to a position adjacent the opposite side thereof, load engaging means mounted for movement with said support means, said load engaging means being adapted to engage and deposit loads at either side of the truck, steering control means located at the operator's station on one of the truck frame assemblies, dirigible wheels located on the other truck frame assembly, and means carried by the movable support means interconnecting the steering control means with the dirigible wheels for effecting movements of said wheels.

18. A truck as claimed in claim 17 wherein said support means is connected to the truck frame assemblies for arcuate movement from one to the other sides of said truck frame assemblies, and means operatively connected to the load engaging means in such a manner that the load engaging means is actuatable in essentially straight-line motion with movement of the support means in said arcuate path from one side of the truck to the other.

19. A self-propelled industrial truck comprising longitudinally spaced front and rear wheel borne truck frame assemblies, prime mover means associated with one of said frame assemblies and connected to drive traction wheels thereof, an operator's station located at one of the truck frame assemblies, and load handling mechanism comprising pivotable arm means interposed in the space between said frame assemblies and pivotally mounted at fixed points to each of said frame assemblies for pivotal movement in vertical planes such that the arm means move during pivoting thereof transversely of the truck only along a curved path, upright load-supporting structure operatively connected to said pivotable arm means and actuatable by said pivotable arm means transversely of the truck, and means for retaining said upright structure in vertical position during movement of said pivotable arm means about said fixed points.

20. An industrial truck comprising spaced apart front and rear wheel borne truck frame assemblies, a load handling mechanism interposed in the space between said frame assemblies and connected thereto for forming the sole structural connection therebetween, said load handling mechanism including means pivotally mounted at longitudinally spaced ends thereof to said frame assemblies, means for actuating said pivot means about the pivotal connections thereof from a location adjacent one side of the frame assemblies to a location adjacent the opposite side thereof, said pivot means being actuated along a curved path during such transverse shifting movement and a load supporting portion of said load handling mechanism being actuated by said pivot means along a substantially horizontal path during such transverse shifting movement.

21. An industrial truck as claimed in claim 20 wherein said load handling mechanism comprises a U-shaped crank means pivotally connected at its end portions to said frame assemblies, upright load lifting means pivotally mounted between the parallel leg portions of said U-shaped crank means, means for maintaining said load lifting means in a substantially upright position during movement of said crank means along a curved path, and means for controlling at least a portion of said load lifting means for movement in an essentially straight line transversely of said wheel borne units during curvilinear movement of said crank means.

22. An industrial truck comprising front and rear wheel borne truck frame assemblies, longitudinally extending means comprising the sole structural means interconnecting said frame assemblies, said structural means including a pair of radially extending arms pivotally supported at the one ends thereof by said frame assemblies for movement in an arcuate path transversely of the truck and means interconnecting said arms at points remote from the pivotal mountings thereof, and a load elevating mechanism supported on the structural means for movement with said structural means.

23. An industrial truck comprising spaced apart front and rear wheel borne truck frame assemblies, a load handling mechanism interposed in the space between said frame assemblies and connected thereto for forming a structural connection therebetween, said load handling mechanism being pivotally mounted at longitudinally spaced ends thereof to said frame assemblies, means for pivoting said mechanism about the pivotal connections thereof from a location adjacent one side of the frame assemblies to a location adjacent the opposite side thereof, an actuating portion of said load handling mechanism comprising transversely extending arm means actuatable during such transverse shifting movement such that the outer end of said arm means rises during movement thereof along a curved path, and a load lifting portion of said load handling mechanism actuable during such transverse shifting movement with less rise than said actuating portion.

24. An industrial truck comprising spaced apart front and rear wheel borne truck frame assemblies, a load handling mechanism interposed in the space between said frame assemblies and connected thereto for forming a structural connection therebetween, said load handling mechanism including longitudinally spaced and transversely extending arm means pivotally connected to respective ones of said frame assemblies, means for pivoting said arm means about the pivotal connections thereof from a location adjacent one side of the frame assemblies to a location transversely adjacent the opposite side thereof, the outer ends of said arm means moving vertically during such transverse shifting movement of the arm means moving vertically during such transverse shifting movement of the arm means, and a load lifting portion of said load handling mechanism actuatable by said arm means during such transverse shifting movement with less vertical movement than the outer ends of said arm means.

25. An industrial truck as claimed in claim 22 wherein dirigible wheel means support one of said truck frame assemblies, control means for said dirigible wheel means located on the other of said truck frame assemblies, and means connecting the control means with said dirigible wheel means for effecting steering movement, said connecting means being carried by said longitudinally extending means.

26. An industrial truck as claimed in claim 25 wherein reversible hydraulic motor means is connected to said dirigible wheel means for actuating same in steering movement, and said connecting means comprises hydraulic conduit means permitting remote selection of steering movement by said control means.

No references cited.

HUGO O. SCHULZ, *Primary Examiner.*

UNITED STATES PATENT OFFICE
CERTIFICATE OF CORRECTION

Patent No. 3,216,598                          November 9, 1965

Dale W. McKee et al.

It is hereby certified that error appears in the above numbered patent requiring correction and that the said Letters Patent should read as corrected below.

Column 7, line 67, strike out "more"; line 70, for "or" read -- of --; column 10, line 23, for "tydraulic" read -- hydraulic --; column 11, line 28, after "said" insert -- load --; column 15, line 7, for "actuable" read -- actuatable --; lines 21 to 23, strike out "moving vertically during such transverse shifting movement of the arm means".

Signed and sealed this 20th day of September 1966.

(SEAL)
Attest:

ERNEST W. SWIDER
Attesting Officer

EDWARD J. BRENNER
Commissioner of Patents